United States Patent
Kaneshige et al.

(10) Patent No.: US 9,806,577 B2
(45) Date of Patent: Oct. 31, 2017

(54) STATOR WITH NEUTRAL LINE SECURED TO STATOR YOKE

(71) Applicant: TOYOTA JIDOSHA KABUSHIKI KAISHA, Toyota-shi, Aichi-ken (JP)

(72) Inventors: Keiichi Kaneshige, Seto (JP); Masashi Matsumoto, Nagoya (JP); Kuniyoshi Shishido, Anjo (JP); Atsushi Watanabe, Toyota (JP); Yuji Sakata, Toyota (JP); Hirotsugu Iwamoto, Nisshin (JP); Tetsuya Maruyama, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 178 days.

(21) Appl. No.: 14/755,465

(22) Filed: Jun. 30, 2015

(65) Prior Publication Data
US 2016/0006313 A1   Jan. 7, 2016

(30) Foreign Application Priority Data
Jul. 1, 2014   (JP) .................................. 2014-135600

(51) Int. Cl.
*H02K 3/38*   (2006.01)
*H02K 3/50*   (2006.01)
*H02K 3/28*   (2006.01)

(52) U.S. Cl.
CPC ................. *H02K 3/38* (2013.01); *H02K 3/28* (2013.01); *H02K 3/50* (2013.01)

(58) Field of Classification Search
CPC .. H02K 3/50; H02K 3/38; H02K 3/28; H02K 11/40
USPC ............................................... 310/71, 216.01
See application file for complete search history.

(56) References Cited

U.S. PATENT DOCUMENTS

| | | | |
|---|---|---|---|
| 5,508,571 A * | 4/1996 | Shafer, Jr. ................ | H02K 3/28 310/179 |
| 6,204,586 B1 | 3/2001 | Umeda et al. | |
| 6,791,227 B2 * | 9/2004 | Yasuhara ................. | H02K 3/12 310/179 |
| 2008/0018193 A1 | 1/2008 | Kobayashi | |
| 2012/0019081 A1* | 1/2012 | Tamura .................... | H02K 3/12 310/43 |

(Continued)

FOREIGN PATENT DOCUMENTS

| JP | 56-22547 A | 3/1981 |
|---|---|---|
| JP | 5-308738 A | 11/1993 |

(Continued)

*Primary Examiner* — Naishadh Desai
(74) *Attorney, Agent, or Firm* — Sughrue Mion, PLLC (57) ABSTRACT

The stator includes a stator core, a plurality of phase windings, a neutral line and a fixing member. The plurality of phase windings are wounded a plurality of times by a predetermined winding method crossing between a plurality of slots. One lead end of each phase winding is supplied with a phase current. The other lead end of each phase winding is a neutral point connecting portion. The other lead end is pulled out from an axially end portion of the stator core. The neutral line connects the neutral point connecting portions of the phase windings of different phases together. The neutral line is separate from the phase windings. The fixing member fixes the neutral line to a yoke portion via an intermediate member. The intermediate member is made of resin.

5 Claims, 5 Drawing Sheets

(56) References Cited

U.S. PATENT DOCUMENTS

| | | | |
|---|---|---|---|
| 2012/0027629 A1* | 2/2012 | Tanahashi | F04D 5/002 417/410.1 |
| 2015/0035397 A1 | 2/2015 | Okinaga et al. | |

FOREIGN PATENT DOCUMENTS

| | | |
|---|---|---|
| JP | 2004-104996 A | 4/2004 |
| JP | 2006-121884 A | 5/2006 |
| JP | 2006-187146 A | 7/2006 |
| JP | 2008-125170 A | 5/2008 |
| JP | 2010-283939 A | 12/2010 |
| JP | 2012-029355 A | 2/2012 |
| JP | 2013-021824 A | 1/2013 |
| JP | 2013-055798 A | 3/2013 |
| JP | 2013-121183 A | 6/2013 |
| WO | 2013/136646 A1 | 9/2013 |
| WO | 2015/040468 A1 | 3/2015 |

* cited by examiner

STATOR WITH NEUTRAL LINE SECURED TO STATOR YOKE

INCORPORATION BY REFERENCE

The disclosure of Japanese Patent Application No. 2014-135600 filed on Jul. 1, 2014 including the specification, drawings and abstract is incorporated herein by reference in its entirety.

BACKGROUND OF THE INVENTION

1. Field of the Invention

The invention relates to a stator for a rotary electric machine, and more particularly, to a stator for a rotary electric machine, in which ends of phase windings are connected at a neutral point (i.e., one end of one phase winding is connected to one end of another phase winding at a neutral point).

2. Description of Related Art

In a stator of a three-phase rotary electric machine, phase windings are wound by a predetermined winding method. A Δ connection and a Y connection are known methods to connect phase windings together. With a Y connection, ends of phase windings are connected at a neutral point (i.e., one end of one phase winding is connected to one end of another phase winding at a neutral point).

In related art, one end of each phase winding is pulled out, and the pulled out end portions of the phase windings are twisted together, for example, to form a neutral point. For example, Japanese Patent Application Publication No. 2006-121884 (JP 2006-121884 A) describes a structure in which a wound portion formed by a stator coil that is wound through slots in a motor stator is provided, and wires that are supplied with phase currents of the phases protrude out from an upper portion of the wound portion, and neutral lines protrude out from a lower portion of the wound portion. Here, a portion of each of the three neutral lines at the lower portion of the wound portion is stripped of an insulation layer, and these stripped portions are overlapped and welded together.

Also, Japanese Patent Application Publication No. 2004-104996 (JP 2004-104996 A) describes pulling out end portions of three different phase coils as neutral point lead portions, placing the pulled out lead portions along an upper portion of a coil end group, and fixing the lead portions to the coil end group by insulated cloth tubing+adhesive, cloth sheet+adhesive, or partial adhesive or the like.

One method of forming the phase coils is to use a plurality of conductor segments that have been formed in U-shapes or the like beforehand. With this method, the conductor segments are bent into a predetermined shape and end portions of the conductor segments are sequentially connected together by welding. In this case, flat wire having a rectangular cross-section may be used as the conductor segments. In this way, when employing a method of connecting the end portions of a plurality of conductor segments of flat wire together by welding, assembly is easier using a neutral line that is separate from the phase windings, than forming a neutral point by twisting the end portions of the flat wires together. That is, the pulled out end portions of the flat wires are welded and connected together via the neutral line.

For example, Japanese Patent Application Publication No. 2012-29355 (JP 2012-29355 A) describes fixing two neutral lines and three interphase wires that are separate from the phase windings together by adhesive, in a coil end of a stator of a rotary electric machine.

Also, Japanese Patent Application Publication No. 2013-121183 (JP 2013-121183 A) proposes a structure in which a neutral line that is attached by welding to a stator of a rotary electric machine is able to be easily replaced when a temperature detection element provided on the neutral line fails. More specifically, a tip end length of a neutral line weld zone to be welded to a neutral line, of an end portion weld zone of conductor segments that form a stator coil, is made twice as long as a same-phase weld zone.

When a neutral line that is separate from the phase windings is used to connect ends of phase windings at a neutral point (i.e., one end of one phase winding to one end of another phase winding at a neutral point) in a stator for a rotary electric machine, the neutral line is connected and arranged in a state floating between ends that have been pulled out from the phase windings (hereinafter, referred to as "lead ends"). When using a conductor segment, the free end of each phase winding is a free end of the conductor segment, so the neutral line is connected and arranged in a state floating between the two free ends. A resonant frequency of vibration of a portion of the neutral line that is connected in the floating state in this way is a frequency that is lower than a natural frequency of vibration of the stator core and a natural frequency of vibration of an assembly of phase windings wound around the stator core, and tends to resonate with external vibration. For example, in a case such as when the rotary electric machine is mounted in a hybrid vehicle, the neutral line may resonate at the frequency of the engine. If the neutral line resonates, the connecting point between the neutral line and the phase windings may separate, and operation of the rotary electric machine may become unstable.

SUMMARY OF THE INVENTION

The invention thus provides a stator for a rotary electric machine that is capable of preventing a neutral line and phase windings from resonating, thereby ensuring the reliability with which the neutral line is fixed to the phase windings, in a structure in which lead ends of phase windings are connected by a neutral line that is separate from the phase windings.

A stator related to the present invention is for a rotary electric machine. The stator includes a stator core, a plurality of phase windings, a neutral line and a fixing member. The stator core includes a yoke portion on an outer peripheral side of the stator core. The stator core has a plurality of slots on an inner peripheral side of the stator core. The slots are arranged in a circumferential direction. The plurality of phase windings are wounded a plurality of times by a predetermined winding method crossing between the plurality of slots. One lead end of each phase winding is supplied with a phase current. The other lead end of each phase winding is a neutral point connecting portion. The other lead end is pulled out from an axially end portion of the stator core. The neutral line connects the neutral point connecting portions of the phase windings of different phases together. The neutral line is separate from the phase windings. The fixing member fixes the neutral line to the yoke portion via an intermediate member. The intermediate member is made of resin.

In the stator for a rotary electric machine according to the invention, the neutral line that is separate from the phase windings is fixed to the yoke portion of the stator core. The natural frequency of the stator core itself is a frequency that is much higher than the resonant frequency of the portion of the neutral line that is in the floating state. The neutral line is fixed to this stator core, so the resonant frequency of the connecting structure between the lead end of each phase winding and the neutral line is able to be higher. As a result, resonance of this connecting structure with the engine or the like is able to be avoided, so stable reliability with which the neutral line is fixed is able to be obtained.

The fixing member may include an adjusting portion between the axially end portion of the stator core and the neutral point connecting portion. The adjusting portion may be configured to absorb variation in an axial position of a connecting end portion of the neutral line.

Also, in the stator for the rotary electric machine according to the invention, the fixing member has the adjusting portion, so variation in the axial position of the connecting end portion of the neutral line is able to be absorbed. As a result, the axial positions of a plurality of connecting end portions are able to be constant, so welding work efficiency improves.

The intermediate member may be integrated with the neutral line. The fixing member may further includes a retaining portion. The retaining portion retains the intermediate member in a manner that enables the intermediate member to slide in an axial direction. The retaining portion is fixed by adhesive to both the intermediate member and an axially end portion of the yoke portion.

Also, in the stator for the rotary electric machine according to the invention, the fixing member includes an intermediate member and a retaining portion. The fixing member has a two body structure, so the neutral line is able to be fixed to the axially end portion of the yoke portion while absorbing any dimensional variation.

The fixing member may define a space in the axial direction between the intermediate member and the retaining portion. With this structure, variation in the axial position of the connecting end portion of the neutral line is able to be absorbed.

The intermediate member may be integrated with the neutral line. The fixing member may further include a fixing plate. The fixing plate defines a space between the fixing plate and the neutral line. The fixing plate is integrated with the intermediate member, and the fixing plate is fixed to a side surface of the yoke portion.

Also, in the stator for the rotary electric machine according to the invention, the fixing member includes the intermediate member and the fixing plate. For example, the neutral line is able to be fixed to the side surface of the yoke portion while absorbing dimensional variation by leaving room in the length dimension of the fixing plate.

The fixing member may define a space in an axial direction between the intermediate member and a connecting portion that connects the fixing plate to the side surface of the yoke portion. With this structure, variation in the axial position of the connecting end portion of the neutral line is able to be absorbed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Example embodiments of the invention will hereinafter be described in detail with reference to the accompanying drawings. In the description below, the winding method of phase windings is a distributed winding method, the phase windings are formed by a plurality of conductor segments, and the conductor segments are made using flat wire with an insulation coating. However, this is merely an example for descriptive purposes. Another structure may also be used as long as it is a structure in which the phase windings are wound around a stator core, and one end of each phase winding is pulled out in order to be connected to a neutral line. For example, the structure may also be such that a winding having a circular cross-section or an elliptical cross-section is wound around a stator core.

The dimensions, shapes, and materials and the like described below are for descriptive purposes only, and may be changed as appropriate according to the specifications of the stator for the rotary electric machine. In the description below, like elements in all of the drawings will be denoted by like reference characters, and redundant descriptions of those elements will be omitted.

Figure 1:
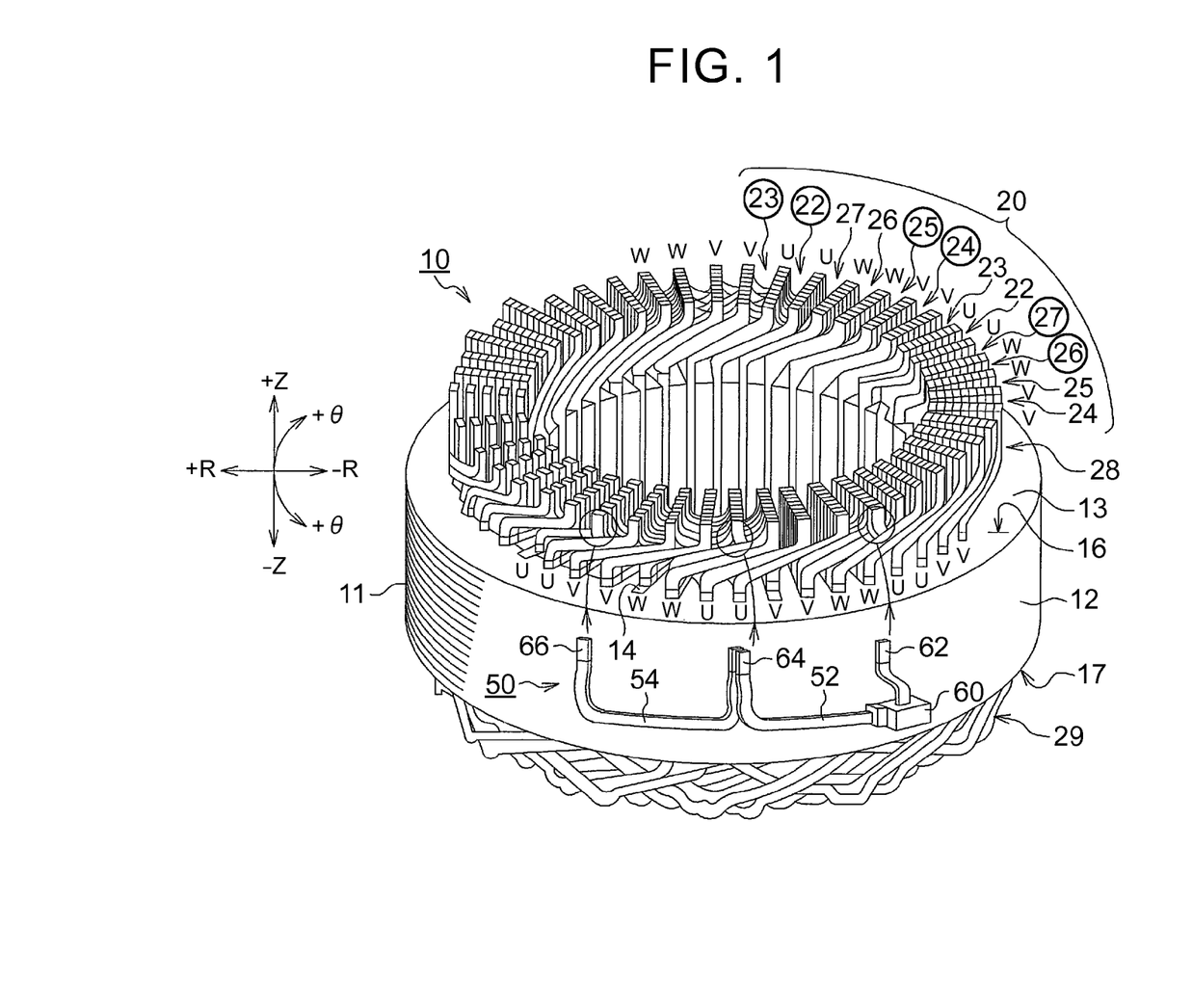
FIG. 1 is a view of an arrangement of a neutral line in a stator for a rotary electric machine according to one example embodiment of the invention.

FIG. 1 is a view of a stator 10 for a rotary electric machine. This stator 10 for a rotary electric machine will hereinafter simply be referred to as "stator 10". The rotary electric machine that uses this stator 10 is a three-phase rotary electric machine that is a motor-generator which functions as an electric motor when a vehicle is powered, and functions as a generator when the vehicle is braking. The rotary electric machine includes the stator 10 shown in FIG. 1, and a rotor arranged to the inner peripheral side of, and separated by a predetermined gap from, the stator 10. A circumferential direction θ, a radial direction R, and an axial direction Z of the stator 10 are indicated in FIG. 1. In the circumferential direction θ, the clockwise direction in FIG. 1 is a +θ direction, and the counterclockwise direction in FIG. 1 is a −θ direction. In the radial direction R, the direction toward the outer peripheral side is a +R direction, and the direction toward the inner peripheral side is a −R direction. In the axial direction Z, the direction toward the top of FIG. 1 is a +Z direction, and the direction toward the bottom of FIG. 1 is a −Z direction.

The stator 10 includes a stator core 12, phase windings 20 that are wound around the stator core 12, and a neutral line 50.

The stator core 12 is an annular magnetic part having a yoke portion 13 on an outer peripheral side, and a plurality of winding insertion slots 14 arranged in the circumferential direction on an inner peripheral side. A stacked body formed by a plurality of annular-shaped magnetic thin plates 11 formed in a predetermined shape, including the slots 14, and stacked together, is used for the stator core 12. Electromagnetic steel plates may be used as the magnetic thin plates 11. Instead of the stacked body of magnetic thin plates 11, magnetic powder may also be integrally formed into a predetermined shape.

The phase windings 20 are three-phase windings that are wound, by a predetermined distributed winding method, around the stator core 12. The phase windings, i.e., U-phase windings 22 and 23, V-phase windings 24 and 25, and W-phase windings 26 and 27, are wound around the stator 10 of the three-phase rotary electric machine. The phase windings 20 of the distributed winding are wound crossing between two slots that are separated by a predetermined number of slots (i.e., a predetermined slot interval), of the plurality of slots 14 that are provided in the circumferential direction on the inner peripheral side of the stator core 12. In FIG. 1, slots that the U-phase windings 22 and 23 are wound crossing between will be denoted by a "U", slots that the V-phase windings 24 and 25 are wound crossing between will be denoted by a "V", and slots that the W-phase windings 26 and 27 are wound crossing between will be denoted by a "W".

In the example shown in FIG. 1, with regards to the plurality of slots 14, slots 14 for each of the different phases are arranged such that same phases are separated by six slots as the predetermined slot interval. Because of this six slot interval, when there are three phases, the arrangement of the slots 14 in the circumferential direction of the stator core 12 is, in order in the clockwise direction, a slot for the U-phase winding 23, a slot for the U-phase winding 22, a slot for the W-phase winding 27, a slot for the W-phase winding 26, a slot for the V-phase winding 25, and a slot for the V-phase winding 24, and this arrangement is repeating. The circles around the phase windings 20 in FIG. 1 will be explained with reference to FIG. 5 that will be described later.

With the phase windings 20, a plurality of conductor segments cross between and are inserted through, from an axially end portion 17 on the other side of the stator core 12, two slots 14 that are separated by the six slot interval, and tip end portions of conductors protruding out from an axially end portion 16 on one side of the stator core 12 are joined sequentially according to a predetermined coil winding method, and wound in the circumferential direction. This is then repeated for a predetermined number of windings.

Each of the conductor segments crossing between and inserted through two slots that are separated by the predetermined slot interval is a single insulation-coated conductor formed having a general U-shape or a general V-shape. A general U-shape is a shape having two leg portions that extend straight, and a curved portion that connects the two leg portions together while separating them by a predetermined leg portion interval. The predetermined leg portion interval of the conductor segment is set to a six slot interval that is the predetermined slot interval.

Flat wire having a rectangular cross-section is used as the insulation-coated conductor used for the conductor segment. Using flat wire enables the coil space factor inside the slots 14 to be improved. The insulation-coated conductor is a conductor in which the outer periphery of wire is coated with an insulation coating. Copper wire, copper-tin alloy wire, silver-coated copper-tin alloy wire, or the like may be used as the wire. A polyamide-imide enamel coating is used as the insulation coating. Instead, however, a coating of polyester-imide, polyimide, polyester, or formal or the like may be used.

The bent portion of the conductor segment comes to the axially end portion 17 on the other side of the stator core 12, and the two leg portions are inserted into two slots 14 that are separated by the six slot interval from the axially end portion 17 on the other side of the stator core 12 toward the axially end portion 16 on the one side. The two leg portions protruding on the side of the axially end portion 16 on the one side are bent into a predetermined shape on the side of the axially end portion 16 on the one side, and are welded to the leg portions of another conductor segment of the same phase that is adjacent. This is repeated for same phases, and winding is performed until there are a predetermined number of windings in the circumferential direction of the stator core 12.

Portions where the leg portions of a plurality of conductor segments are sequentially connected protrude from the axially end portion 16 on the one side of the stator core 12 to form a coil end 28. The bent portions of the plurality of conductor segments protrude to form a coil end 29 on the axially end portion 17 on the other side.

In FIG. 1, with the U-phase, a winding that is wound five times around the stator core 12 is represented by the U-phase winding 22. When wound five times around, the winding fills up the entire length, from the outer peripheral side to the inner peripheral side, of one slot, so the winding is moved over one slot and wound another five times around. In FIG. 1, the winding that continues on from the U-phase winding 22 and is moved over one slot and wound the second five times around is represented by the U-phase winding 23. The U-phase windings 22 and 23 are not separate U-phase windings, but instead correspond to the first five times that the U-phase winding is wound, of the ten total times, and the second five times that the U-phase winding is wound after moving over one slot and continuing on. The V-phase windings 24 and 25 and the W-phase windings 26 and 27 are also similar in this respect. Five and ten for the number of times that the windings are wound are examples. The number of times that the windings are wound may also be another number.

In the example described above, one end of each phase winding that has been wound ten times is a circuit side connecting portion for connecting to each phase power line of a rotary electric machine driving circuit such as an inverter, not shown, and the other end is a neutral point connecting portion for forming a neutral point. In the description below, the neutral point connecting portion is provided on an end portion of the U-phase winding 22, the V-phase winding 24, and the W-phase winding 26, and the circuit side connecting portion is provided on an end portion of the U-phase winding 23, the V-phase winding 25, and the W-phase winding 27. An insulation coating removal process is performed in preparation for a weld connection, on the circuit side connecting portion and the neutral point connecting portion. The circuit side connecting portion, the neutral point connecting portion, and the neutral line 50 that is connected to the neutral point connecting portion, are provided on the side with the coil end 28 that protrudes from the axially end portion 16 on the one side of the stator core 12. The +Z direction side in the Z direction is the side of the stator core 12 with the coil end 28, and is the side where the neutral line 50 is connected.

Figure 2:
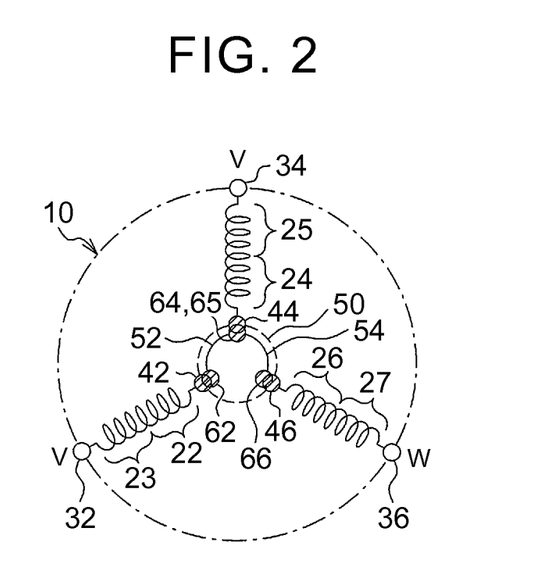
FIG. 2 is a view showing the relationship between the neutral line and phase windings in the stator for the rotary electric machine according to the example embodiment of the invention.

FIG. 2 is a view of the relationship between the neutral line 50, and a neutral point connecting portion 42 of the U-phase winding 22, a circuit side connecting portion 32 of the U-phase winding 23, a neutral point connecting portion 44 of the V-phase winding 24, a circuit side connecting portion 34 of the V-phase winding 25, a neutral point connecting portion 46 of the W-phase winding 26, and a circuit side connecting portion 36 of the W-phase winding 27, of the stator 10.

The neutral line 50 is an insulation-coated flat wire, similar to the phase windings 20, that has been formed in a predetermined shape. The neutral line 50 has a UV connecting wire 52 that connects the neutral point connecting portion 42 of the U-phase winding 22 to the neutral point connecting portion 44 of the V-phase winding 24, and a VW connecting wire 54 that connects the neutral point connecting portion 44 of the V-phase winding 24 to the neutral point connecting portion 46 of the W-phase winding 26.

The UV connecting wire 52 has insulation-coating removed portions 62 and 64 where the insulation coating has been removed on both end sides. The insulation-coating removed portion 62 is connected to the neutral point connecting portion 42 of the U-phase winding 22, and the insulation-coating removed portion 64 is connected to the neutral point connecting portion 44 of the V-phase winding 24. The VW connecting wire 54 also has insulation-coating removed portions 65 and 66 where the insulation coating has been removed on both end sides. The insulation-coating removed portion 65 is connected to the neutral point connecting portion 44 of the V-phase winding 24, and the insulation-coating removed portion 66 is connected to the neutral point connecting portion 46 of the W-phase winding 26.

The insulation-coating removed length of the circuit side connecting portion and the neutral point connecting portion of each phase winding 20 is the same length as the length (i.e., the insulation-coating removed length) of the insulation-coating removed portions 62, 64, 65, and 66 of the neutral line 50. As an example, the length is set to a length one to several times the length of a long side of the flat wire. For example, when the length of the long side of the flat wire is approximately 1 mm, the insulation-coating removed length is set to one to several millimeters. For the weld connection, TIG (Tungsten Inert Gas) welding may be used, whereby welding is performed by making the atmosphere around two terminals that are objects to be welded together (i.e., welding objects) an inert gas atmosphere, giving the welding objects a ground potential, and applying a predetermined high-voltage pulse between the ground potential and a tungsten electrode that is near the welding objects to increase the temperature of the welding objects.

Figure 3:
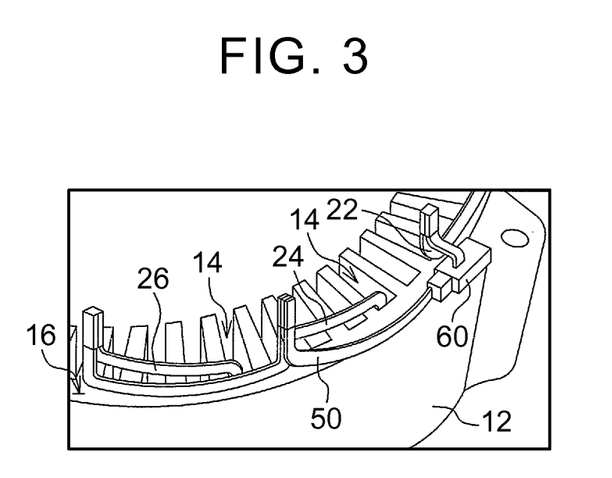
FIG. 3 is a view showing neutral point connecting portions pulled out from the phase windings, connected by the neutral line, in the stator for the rotary electric machine according to the example embodiment of the invention.
Figure 4:
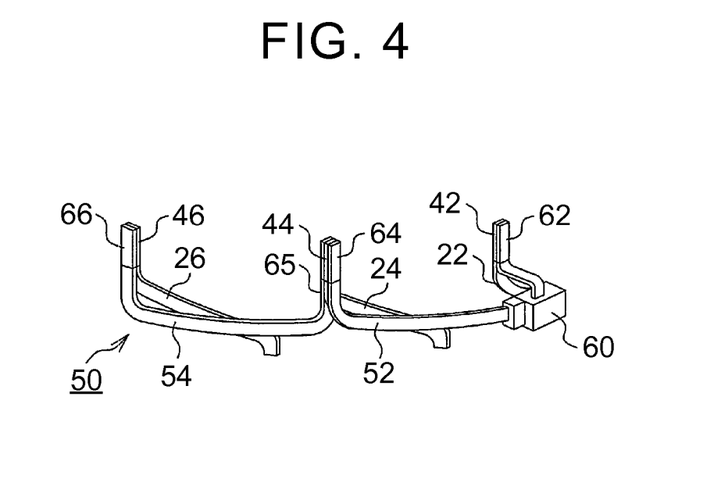
FIG. 4 is a detailed view taken from FIG. 3, of the connection relationship between neutral point connecting portions of the phase windings and portions of the neutral line where an insulation coating has been removed.

FIG. 3 is a view showing the U-phase winding 22, the V-phase winding 24, and the W-phase winding 26 that are connected to the neutral line 50, removed from FIG. 1. FIG. 4 is a view of the neutral line 50, and the U-phase winding 22, the V-phase winding 24, and the W-phase winding 26 that are connected to the neutral line 50, with the stator core 12 and the slots 14 omitted from FIG. 3.

As shown in FIG. 4, the insulation-coating removed portion 62 of the UV connecting wire 52 is connected to the neutral point connecting portion 42 of the U-phase winding 22, and the insulation-coating removed portion 64 is connected to the neutral point connecting portion 44 of the V-phase winding 24. The insulation-coating removed portion 65 of the VW connecting wire 54 is connected to the neutral point connecting portion 44 of the V-phase winding 24, and the insulation-coating removed portion 66 is connected to the neutral point connecting portion 46 of the W-phase winding 26.

In FIG. 4, the UV connecting wire 52 and the VW connecting wire 54 are formed by separate insulation-covered conductors, and the UV connecting wire 52 and the VW connecting wire 54 are arranged sandwiching the neutral point connecting portion 44 of the V-phase winding 24. That is, the insulation-coating removed portion 64 of the UV connecting wire 52 is arranged on a side surface on one side of the neutral point connecting portion 44 of the V-phase winding 24, and the insulation-coating removed portion 65 of the VW connecting wire 54 is arranged a side surface on the opposite side of the neutral point connecting portion 44. All three of the insulation-coating removed portion 64, the neutral point connecting portion 44, and the insulation-coating removed portion 65 are integrally connected by TIG welding.

Instead of this, the UV connecting wire 52 and the VW connecting wire 54 may be formed by a single insulation-coated conductor, and this single insulation-coated conductor may be bent so as to sandwich the neutral point connecting portion 44 of the V-phase winding 24, with a side on one side of the bend serving as the UV connecting wire 52, and the side on the other side of the bend serving as the VW connecting wire 54. In this case, because the structure is a bent structure, the insulation-coating removed length at the bend is that shown in FIG. 4 (i.e., the length of the insulation-coating removed portion 64+the length of the insulation-coating removed portion 65), which is twice the insulation-coating removed length of other locations.

A temperature sensor 60 in FIGS. 1, 3, and 4 is neutral point temperature detecting means provided on the neutral line 50, for estimating a temperature of the phase windings 20.

As shown in FIG. 4, the neutral line 50 is connected and arranged in a state floating between the neutral point connecting portion 42 of the U-phase winding 22, the neutral point connecting portion 44 of the V-phase winding 24, and the neutral point connecting portion 46 of the W-phase winding 26, which have been pulled out from the phase windings 20. The neutral point connecting portions 42, 44, and 46 are free ends of the conductor segments, so the neutral line 50 is connected and arranged in a floating state between two free ends. The resonant frequency of the portion of the neutral line 50 that is connected in this floating state is a frequency that is lower than a natural frequency of vibration of the stator core 12 and a natural frequency of vibration of an assembly of the phase windings 20 wound around the stator core 12.

In a hybrid vehicle provided with an engine and a rotary electric machine, as an example, the natural frequency of vibration of the stator core 12 and the natural frequency of vibration of an assembly of the phase windings 20 wound around the stator core 12 is approximately 500 to 1,000 kHz. In contrast, the resonant frequency of the portion of the neutral line 50 that is floating of the structure shown in FIG. 4 is approximately 200 kHz or less. A secondary frequency of vibration from firing/combustion when the maximum speed of a four cylinder engine of the hybrid vehicle is 5,000 rpm is 375 kHz, so the portion of the neutral line 50 that is floating in FIG. 4 resonates at the secondary frequency of vibration from the firing/combustion of the engine.

Figure 5:
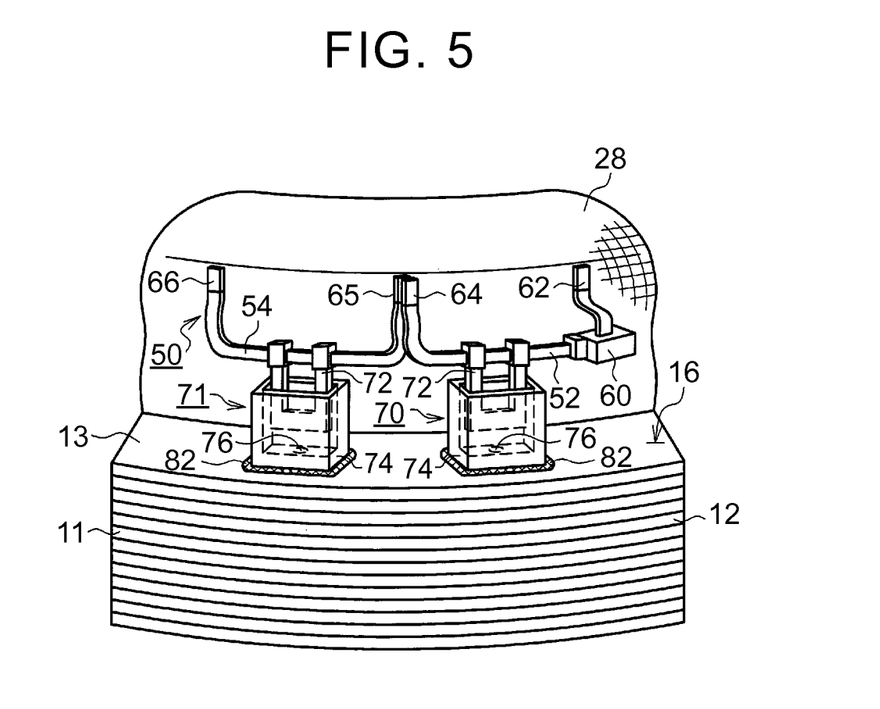
FIG. 5 is a view of an example in which the neutral line is fixed to an axially end portion of a yoke portion by two fixing members, in the stator for the rotary electric machine according to the example embodiment of the invention.
Figure 6:
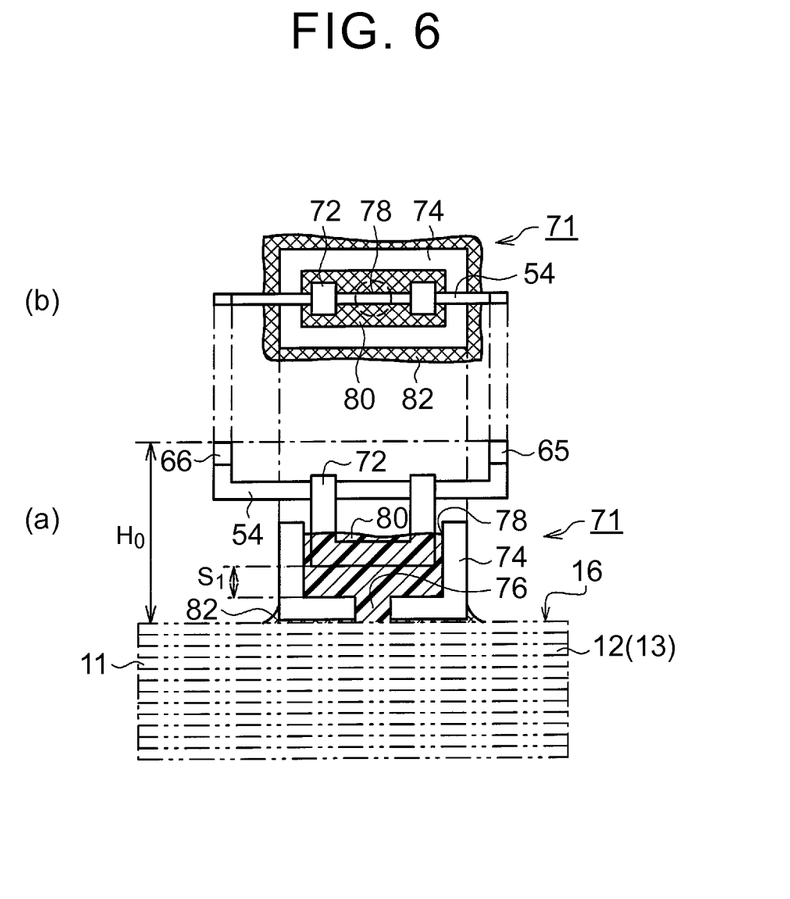
FIG. 6 is a detailed view one of the fixing members in FIG. 5, with (a) illustrating a sectional view and (b) illustrating a plan view.
Figure 7:
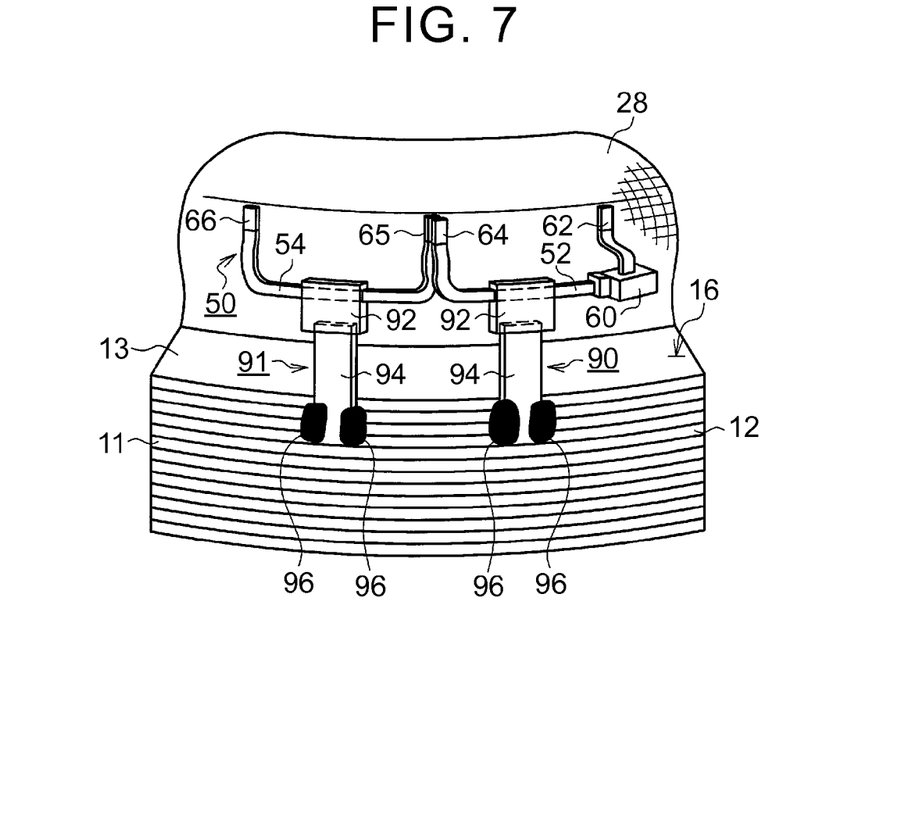
FIG. 7 is a view of an example in which the neutral line is fixed to a side surface of the yoke portion by two fixing members, in the stator for the rotary electric machine according to the example embodiment of the invention.
Figure 8:
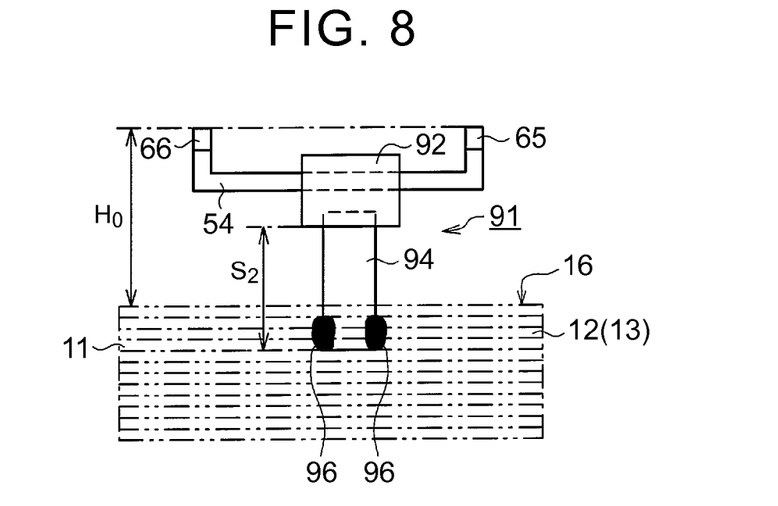
FIG. 8 is a detailed view of one of the fixing members in FIG. 7.

FIGS. 5 to 8 are views of structures in which the resonant frequency of the portion of the neutral line 50 is increased by fixing the neutral line 50 to the stator core 12, because the natural frequency of vibration of the stator core 12 itself is high. FIGS. 5 and 6 are views of the structure of fixing members 70 and 71 that fix the neutral line 50 to the axially end portion 16 of the yoke portion 13 of the stator core 12, and FIGS. 7 and 8 are views of the structure of fixing members 90 and 91 that fix the neutral line 50 to a side surface of the yoke portion 13 of the stator core 12.

FIG. 5 is a view of a state in which the neutral line 50 is fixed to the axially end portion 16 of the yoke portion 13 of the stator core 12 by the fixing members 70 and 71. The fixing member 70 is used to fix the UV connecting wire 52 of the neutral line 50 to the axially end portion 16 of the yoke portion 13, and the fixing member 71 is used to fix the VW connecting wire 54 of the neutral line 50 to the axially end portion 16 of the yoke portion 13. The fixing members 70 and 71 have the same structure, so only the fixing member 71 used with the VW connecting wire 54 which is not provided with the temperature sensor 60 will be described below. FIG. 6 is a detailed view of the fixing member 71, with (a) illustrating a sectional view and (b) illustrating a front view.

In FIG. 5, the U-phase winding 22, the V-phase winding 24, and the W-phase winding 26 that are connected to the neutral line 50 described with reference to FIG. 4 are omitted. Instead, a frame format of the coil end 28 is shown. The fixing member 71 includes a resin intermediate member (hereinafter, simply referred to as an "intermediate member") 72 that is integrated with the VW connecting wire 54, and an intermediate member retaining portion (hereinafter, simply referred to as a "retaining portion") 74 retains the intermediate member 72 in a manner such that the intermediate member 72 is able to slide in the axial direction. The retaining portion 74 fixes and retains the intermediate member 72 with resin 80, and is itself fixed to the axially end portion 16 of the yoke portion 13 by resin 82.

The intermediate member 72 is a member that retains the VW connecting wire 54 while electrically insulating the VW connecting wire 54. The intermediate member 72 has a U shape so as to be able to support the VW connecting wire 54 in two locations. The intermediate member 72 and the VW connecting wire 54 are integrated using insert-forming technology. For example, two dies that are halves of a split die, i.e., an upper die and a lower die, into which the outer shape of the intermediate member 72 has been cut, are used. The dies are vertically opened and the VW connecting wire 54 is put into place. Then the two upper and lower dies are closed and injection molding is performed by injecting resin from a suitable resin injection hole. The resultant integrated intermediate member 72 and VW connecting wire 54 can then be removed by vertically opening the dies.

Instead of using insert-forming technology, a member formed into a U-shape having a groove into which the VW connecting wire 54 can be arranged in a tip end portion of the U-shape may also be used as the intermediate member 72. In this case, after the VW connecting wire 54 is arranged in the groove, the intermediate member 72 and the VW connecting wire 54 are firmly fixed with adhesive or the like.

Material having suitable strength and electrical insulating properties is used for the resin of the intermediate member 72. For example, a polycarbonate (PC) resin, an epoxy resin, or a polystyrene (PS) resin or the like may be used.

The retaining portion 74 is arranged on an upper surface of the axially end portion 16 of the yoke portion 13 of the stator core 12. The retaining portion 74 is a box-shaped member made of resin that has an upper opening in the +Z direction. A through-hole 76 is provided in a bottom surface.

The retaining portion 74 is arranged in a predetermined position on the upper surface of the axially end portion 16 of the yoke portion 13. This predetermined position is a position that enables the intermediate member 72 to just be inserted into an internal space of the box shape of the retaining portion 74.

The upper opening of the box shape of the retaining portion 74 is an insertion opening of the intermediate member 72, which is a filling port for fixing resin. The through-hole 76 in the bottom surface is an outflow port through which resin flows out when resin is filled into the internal space of the box shape. The internal space of the box shape is a space within which the intermediate member 72 is housed, and into which the fixing resin is filled. The internal space of the box shape has an inside shape that is larger than the outer shape of the intermediate member 72.

As shown by (a) and (b) in FIG. 6, a gap 78 is provided between an inner wall surface of the internal space of the box shape and the outer shape of the intermediate member 72. This gap 78 is used to bring resin that has been injected from the upper opening in the box shape around to fill the underside of the intermediate member 72. Also, as shown by (a) in FIG. 6, an additional space $S_1$ is provided between the surface of the lowest portion of the intermediate member 72 and the bottom surface of the retaining portion 74. This additional space $S_1$ is one example of an adjusting portion. This additional space $S_1$ enables the height position of the insulation-coating removed portions 65 and 66 that are the connecting end portion of the VW connecting wire 54 to match a predetermined height $H_0$ from the axially end portion 16 of the yoke portion 13 to the neutral point connecting portions 44 and 46 of the phase windings 20. Here, this height position is a position in the axial direction of the rotary electric machine. Providing this additional space $S_1$ enables variation in shape of the VW connecting wire 54, and variation in shape of the intermediate member 72, and the like to be absorbed. As a result, the height position of the insulation-coating removed portions 65 and 66 of the VW connecting wire 54 is able to match the predetermined height $H_0$ that is set in advance. In other words, variation in the axial positions of the plurality of insulation-coating removed portions 65 and 66 is able to be absorbed, so the axial positions of the plurality of insulation-coating removed portions 65 and 66 are able to be aligned.

A member made of the same resin as the intermediate member 72, and that has been formed in a predetermined shape, may be used for the retaining portion 74.

The operation of the structure will now be described. The VW connecting wire 54 is integrally molded with the intermediate member 72 in advance. The retaining portion 74 is prepared separately, and the intermediate member 72 is inserted into the internal space of the box shape of the retaining portion 74, and before fixing resin is injected, the retaining portion 74 is placed onto the upper surface of the axially end portion 16 of the yoke portion 13. Then, the positions of the insulation-coating removed portions 65 and 66 of the VW connecting wire 54 are aligned with the positions of the neutral point connecting portion 44 of the V-phase winding 24 and the neutral point connecting portion 46 of the W-phase winding 26, which are the welding objects. The height position is made to match the predetermined height $H_0$ using the additional space $S_1$.

The VW connecting wire 54 is retained in this state, and fixing resin is injected from the upper opening in the retaining portion 74. The injected resin comes around below the intermediate member 72 through the gap 78, and fills the internal space of the box shape. The filling amount is an amount that enables the intermediate member 72 to be sufficiently retained by the resin, as shown by (a) of FIG. 6. The filled resin passes through the through-hole 76 and flows through a gap between the outside bottom surface of the retaining portion 74 and the upper surface of the axially end portion 16 of the yoke portion 13, and out to the outer peripheral wall surface of the retaining portion 74. In this state, the filled resin 80 and the resin 82 that has flowed out solidify by being appropriately heated. In this way, the VW connecting wire 54 is strongly fixed to the axially end portion 16 of the yoke portion 13 via the intermediate member 72, the retaining portion 74, the filled resin 80, and the resin 82 that has flowed out. This is also the same for the UV connecting wire 52. When the resin hardens with the wires aligned at the predetermined height $H_0$, the insulation-coating removed portion 65 of the VW connecting wire 54 is weld connected to the neutral point connecting portion 44 of the V-phase winding 24, and the insulation-coating removed portion 66 of the VW connecting wire 54 is weld connected to the neutral point connecting portion 46 of the W-phase winding 26.

In the description above, the wires are aligned at the predetermined height $H_0$ and the resin is filled and hardened, and then the wires are weld connected. Alternatively, first, the wires may be aligned at the predetermined height $H_0$ and weld connected, and then resin may be filled and hardened. In this case as well, the additional space $S_1$ is provided, so the height position is able to match the predetermined height $H_0$.

FIG. 7 is a view of state in which the neutral line 50 is fixed to a side surface of a yoke portion 13 by the stator core 12 using the fixing members 90 and 91. The fixing member 90 is used to fix the UV connecting wire 52 of the neutral line 50 to the side surface of the yoke portion 13, and the fixing member 91 is used to fix the VW connecting wire 54 of the neutral line 50 to the side surface of the yoke portion 13. The fixing members 90 and 91 have the same structure, so only the fixing member 91 used with the VW connecting wire 54 that is not provided with the temperature sensor 60 will be described below. FIG. 8 is a detailed view of the fixing member 91.

In FIG. 7, the U-phase winding 22, the V-phase winding 24, and the W-phase winding 26 that are connected to the neutral line 50 described with reference to FIG. 4 are omitted. Instead, a frame format of the coil end 28 is shown. The fixing member 91 includes a resin intermediate member 92 that has been integrated with the VW connecting wire 54, and a fixing plate 94 that is fixed to the side surface of the yoke portion 13. The fixing plate 94 is arranged a predetermined distance apart from the VW connecting wire 54 so as not to contact the VW connecting wire 54, and integrated with the intermediate member 92.

The intermediate member 92 is a member that retains the VW connecting wire 54 and the fixing plate 94 while electrically insulating them. In this way, the VW connecting wire 54, the intermediate member 92, and the fixing plate 94 are integrally formed. This integration is achieved using insert-forming technology. For example, two dies that are halves of a split die, i.e., an upper die and a lower die, into which the outer shape of the intermediate member 72 has been cut, are used. The dies are vertically opened and the VW connecting wire 54 and the fixing plate 94 are arranged separated from each other. Then the two upper and lower dies are closed and injection molding is performed by injecting resin from a suitable resin injection hole. The integrated intermediate member 92, VW connecting wire 54, and fixing plate 94 can then be removed by vertically opening the dies.

Material having suitable strength and electrical insulating properties is used for the resin of the intermediate member 72. For example, a polycarbonate (PC) resin, an epoxy resin, or a polystyrene (PS) resin or the like may be used.

The fixing plate 94 is a plate that is fixed by welding to the side surface of the yoke portion 13 of the stator core 12. The tip end side of the fixing plate 94 is abutted against the side surface of the yoke portion 13 and welded thereto. The length overlapping the yoke portion 13 is set to a dimension that is longer than is required to provide weld strength. That is, as shown in FIG. 8, the length on the tip end side of the fixing plate 94 measured from the bottom surface of the intermediate member 92 when integrally formed is set to an additional space $S_2$ that enables variation in shape to be absorbed. This additional space $S_2$ is one example of an adjusting portion. This additional space $S_2$ enables the height positions of the insulation-coating removed portions 65 and 66 that are the connecting end portion of the neutral line 50 to match the predetermined height $H_0$ from the axially end portion 16 of the yoke portion 13 to the neutral point connecting portions 44 and 46 of the phase windings 20. Providing this additional space $S_2$ enables variation in shape of the neutral line 50, variation in shape of the intermediate member 92, and variation in the dimensions of the fixing plate 94, and the like to be absorbed. As a result, the height positions of the insulation-coating removed portions 65 and 66 of the neutral line 50 are able to match the predetermined height $H_0$ that is set in advance. In other words, variation in the axial positions of the plurality of insulation-coating removed portions 65 and 66 is able to be absorbed, so the axial positions of the plurality of insulation-coating removed portions 65 and 66 are able to be aligned.

The operation of this structure will be described. The VW connecting wire 54 is integrally molded with the intermediate member 92 and the fixing plate 94 in advance. Then, while abutting the fixing plate 94 against the side surface of the yoke portion 13, the positions of the insulation-coating removed portions 65 and 66 of the VW connecting wire 54 are aligned with the positions of the neutral point connecting portion 44 of the V-phase winding 24 and the neutral point connecting portion 46 of the W-phase winding 26 that are the welding objects. The height position is set to match the predetermined height $H_0$ using the additional space $S_2$.

The VW connecting wire 54 is maintained in this state, and the fixing plate 94 is weld connected to the side surface of the yoke portion 13. The welded connection may be performed using the TIG welding method. A weld connected portion formed in this way is shown in FIGS. 7 and 8. In this way, the VW connecting wire 54 is strongly fixed to the side surface of the yoke portion 13 of the stator core 12 via the intermediate member 92 and the fixing plate 94.

What is claimed is:

1. A stator for a rotary electric machine, the stator comprising:
    a stator core including a yoke portion on an outer peripheral side of the stator core, the stator core having a plurality of slots on an inner peripheral side of the stator core, the slots being arranged in a circumferential direction;
    a plurality of phase windings wounded a plurality of times by a predetermined winding method crossing between the plurality of slots, one lead end of each phase winding being supplied with a phase current, the other lead end of each phase winding being a neutral point connecting portion, and the other lead end being pulled out from an axially end portion of the stator core;

a neutral line that connects the neutral point connecting portions of the phase windings of different phases together, the neutral line being separate from the phase windings; and a fixing member that fixes the neutral line to the yoke portion via an intermediate member, the intermediate member being made of resin, wherein the fixing member includes an adjusting portion between the axially end portion of the stator core and the neutral point connecting portion; and the adjusting portion is configured to absorb variation in an axial position of a connecting end portion of the neutral line.

2. The stator according to claim 1, wherein the intermediate member is integrated with the neutral line;

the fixing member further includes a retaining portion; and the retaining portion retains the intermediate member in a manner that enables the intermediate member to slide in an axial direction, the retaining portion being fixed by adhesive to both the intermediate member and an axially end portion of the yoke portion.

3. The stator according to claim 2, wherein the fixing member defines a space in the axial direction between the intermediate member and the retaining portion.

4. The stator according to claim 1, wherein the intermediate member is integrated with the neutral line;

the fixing member further includes a fixing plate; and the fixing plate defines a space between the fixing plate and the neutral line, the fixing plate is integrated with the intermediate member, and the fixing plate is fixed to a side surface of the yoke portion.

5. The stator according to claim 4, wherein the fixing member defines a space in an axial direction between the intermediate member and a connecting portion that connects the fixing plate to the side surface of the yoke portion.

\* \* \* \* \*